Aug. 1, 1950     T. DE FOREST ET AL     2,516,857
METHOD OF DETECTING CRACKS IN POROUS SURFACES
Filed May 8, 1947
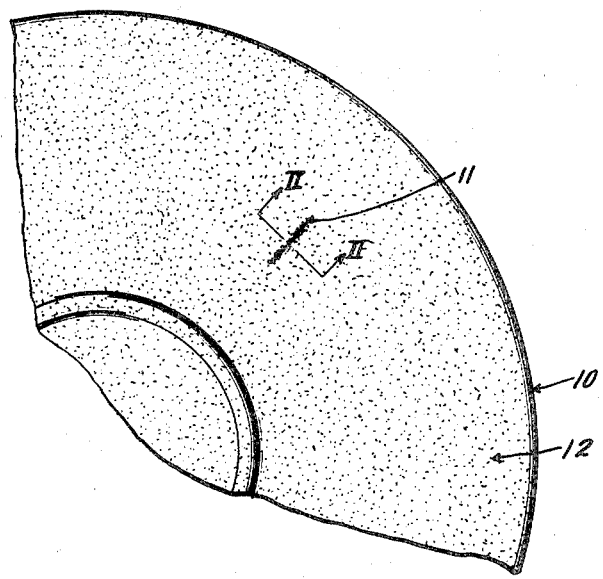
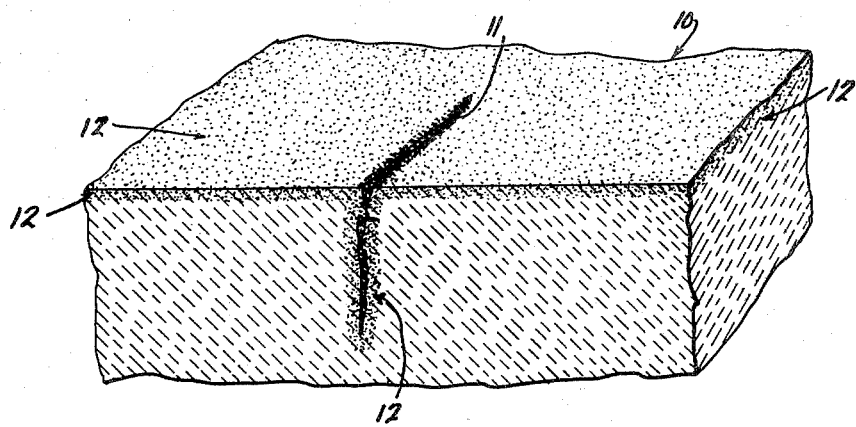
Inventors
TABER DE FOREST
HENRY N. STAATS Patented Aug. 1, 1950

2,516,857

UNITED STATES PATENT OFFICE 2,516,857

METHOD OF DETECTING CRACKS IN POROUS SURFACES

Taber de Forest, Northbrook, and Henry N. Staats, Chicago, Ill., assignors to Magnaflux Corporation, Chicago, Ill., a corporation of Delaware Application May 8, 1947, Serial No. 746,834

9 Claims. (Cl. 73—104)

This invention relates to a method of detecting cracks in porous surfaces and more particularly to the method of detecting cracks by disposing a liquid and pigment over the surface and thereafter draining the liquid at least partially therethrough to leave a concentration of pigment coextensive with the cracks.

In accordance with the principles of our present invention, a liquid and pigment are disposed over the porous surface in which cracks are to be detected. The pigment may be colored and preferably includes particle sizes greater than the width of the cracks to be detected so that as the liquid drains through the cracks, a very visible indication of the presence of cracks is readily obtained.

The method of our invention may be applied to the detecting of cracks in unglazed porcelain or china articles which subsequently are to be fused. In such a case the pigment is preferably of such character that it will be dissipated upon heating the articles so as to avoid staining the finished articles.

The method may also be employed for detecting cracks in wood, as well as cracks in fired but porous ceramics, such as spark plug insulators and resistor tubes.

The explanation of the phenomena forming the basis of the method of our invention is probably that liquid flooded over a porous surface will tend to drain more quickly through the larger openings or cracks therein. As a result, a much larger concentration of pigment particles tends to form in and about cracks, since a greater amount of water will drain therethrough than through the normal pores of the surface.

It is therefore an important object of our invention to provide a method of detecting cracks in porous surfaces or articles which is extremely simple, efficient and economical, and which lends itself to use in mass production.

It is a further object of this invention to provide a method of detecting cracks in porous surfaces or articles wherein the detecting material may be dissipated in the normal course of production of the article, thereby avoiding staining thereof.

It is a further object of this invention to provide a method for detecting cracks in porous surfaces, wherein a quick and readily visible indication of both the existence and the dimensions of crack, if any, is provided, and wherein if desired different size cracks may be differentiated.

Other and further important objects of this invention will be apparent from the disclosure in the specification and accompanying drawings.

On the drawings:

Figure 1 is a plan view of a porous surface of a portion of an unglazed china saucer having a crack therein upon which the method of our invention is to be carried out; and Figure 2 is an enlarged sectional view taken substantially along the line II—II of Fig. 1, showing the manner in which pigment will build up about a crack therein.

As shown on the drawings:

The method of our invention may be applied to a porous surface of unglazed ceramic material, wood, or a fired but porous ceramic. Thus, our method is applicable for discovering checks in wood and cracks in such articles as spark plug insulators and resistor tubes, as well as in such porous articles as unglazed porcelain or china. The cracks to be detected may be larger than the size of the pores in the surface, but difficult if not impossible to see with the unaided eye due to the diffractive rather than reflective nature of the surface, for instance where the surface is a porous unglazed ceramic surface.

The method of our invention will be described by way of example as applied to an article made of unglazed china. It is, of course, desirable in such a case to discover cracks in the surfaces of the article before time and money are invested in the glazing thereof. It is further necessary that the inspection for cracks be adapted to use in mass production in order to be practical, and particularly that the method be quick and simple and render the cracks readily observable.

In Figures 1 and 2, the reference numeral 10 indicates a portion of a saucer of unfired china having in the porous surface thereof a crack 11. By unfired china is meant the clay product after it has been dried, before going to the first kiln. The cracks located by our method may be caused by drying or by shrinkage.

In applying our method, a liquid containing a suspended colored pigment may be lightly flooded upon the porous surface of the china. The colored or at least contrasting pigment, indicated by the reference numeral 12, in this case is preferably such that it will be dissipated as by sublimation, upon firing and will not therefore stain the finished article.

When testing for checks in wood, it might be desirable to use a pigment which would sublime at room temperature, thus eliminating any cleaning problems. Camphor, menthol, and paradichlorbenzine are examples of chemicals that sublime at room temperature.

Pigments of different particle sizes and colors might be used to differentiate between different size cracks, a mixed group of particles obtaining at cracks of smaller than a predetermined size and particles of only one color tending to predominate at larger cracks.

If the pigment particles are elongated they will tend to tangle at the crack thus causing an exaggerated build up. Cracks in unfired clay are jagged, so that needle-shaped particles will be combed out. Single needle-shaped particles are difficult to see when they lie at random. Fine flock (#30) cotton or rayon has proved a successful powder.

Examples of suitable colored pigments which will sublime easily are "permanssa" red and toluidine red. A range of particle sizes is desirable in order for the method to function efficiently on several widths of cracks. A suitable mixture for use with unfired china is 1 part "permanssa" red in 30 parts of kerosene. Other examples of liquids which are suitable are water, diethylene glycols, ethyl alcohol, ethyl acetate, and carbon tetrachloride. Example of pigments which do not sublime easily are iron oxides and calcium carbonates. The size of iron oxide particles which works well is under five microns. However, a wood flour of around 100 mesh can be used in the case of larger cracks. The "permanssa" red mentioned above is over 325 mesh.

A further aid in making indications visible is to use fluorescent pigments such as anthracine.

After the porous surface of the saucer 10 has been flooded, the liquid is allowed to drain. Due to the greater volume of drainage through the cracks, a concentration of pigment builds up coextensively with any cracks, for example at the crack 11 as shown in Fig. 2, giving an indication not only of the existence, but also of the dimensions thereof. Particularly if the particle sizes of the pigment are on the average larger than the cracks to be detected and the pigment is of a color different from or in contrast to the surface under test, a very visible indication of the presence of the cracks is readily obtained. As shown in Figure 2, pigment particles of a size smaller than the pores of the saucer will slowly infiltrate into the pores thereof from the top surface of the saucer and from the surfaces within the crack and some of the particles larger than the pores will remain dispersed over the upper surface of the saucer.

Other methods of applying the pigment and liquid to the surface which have been found satisfactory are by separately spraying the liquid and pigment powder, in either order, upon the surface and allowing the liquid to drain at least partially; or dipping the surface into a suspension of liquid and pigment and allowing drainage from the surface. Thus it will be readily apparent that not only is our method simple and effective, but also is readily adaptable to and suitable for use in mass production.

While the method of our invention has been described as being generally applicable to the testing of relatively porous articles having surface cracks or checks therein, our method is peculiarly suitable to the detection of fissures or other surface discontinuities that are practically invisible to the unaided eye yet are of substantially larger dimensions than the normal pores in the surface undergoing test.

It will, of course, be understood that various details may be varied through a wide range without departing from the principles of this invention and it is, therefore, not the purpose to limit the patent granted hereon otherwise than necessitated by the scope of the appended claims.

We claim as our invention:

1. The method of detecting cracks in a porous surface, which comprises flooding the surface of a porous article with a suspension of discrete pigment particles in a liquid medium and allowing the liquid to drain therethrough, thereby leaving the pigment particles concentrated coextensively of any cracks that may be present in said surface.

2. The method of detecting cracks in a ceramic article having a porous surface to be vitrified which comprises lightly flooding the porous surface with a liquid suspension of discrete pigment particles which will be dissipated at the vitrifying temperature to which the article is subsequently subjected, allowing the liquid phase to drain through said surface, and observing any accumulation of pigment particles on said surface after drainage of liquid therefrom.

3. The method of detecting cracks in porous surfaces, which comprises, disposing over the surface a liquid and a colored pigment having particle sizes at least some of which are greater than the cracks to be detected, thereby detecting cracks.

4. The method of detecting cracks in porous surfaces which comprises, disposing over a surface in either order a liquid and a plurality of pigments of varying colors and particle sizes and allowing the liquid at least partially to drain therethrough, whereby different size cracks may be detected visually.

5. The method of detecting cracks in a porous article having a light diffractive surface, which comprises disposing thereon in either order a liquid and pigment particles to produce thereon a fluid suspension of said pigment particles in said liquid and allowing the liquid to drain at least partially through the pores to deposit pigment particles on said surface, whereby cracks larger than the size of the pores in the surfaces but substantially invisible to the unaided eye due to the diffractive nature of the surface may be detected.

6. The method of detecting cracks in porous surfaces which comprises flooding the porous surface with a dispersion of discrete pigment particles suspended in a liquid medium, causing the liquid medium to drain through the surface and any cracks present therein to deposit at least some of said pigment particles at said cracks, and observing any concentration of pigment that forms at said cracks due to more rapid drainage of said liquid medium through said cracks.

7. The method of detecting cracks in porous surfaces, which comprises flooding said surface with a dispersion of discrete colored particles in a liquid medium, said particles having particle sizes at least some of which are greater than the cracks to be detected, and observing any concentration of said particles on said surface to determine the presence of any cracks in the surface.

8. The method of detecting cracks in porous surfaces, which comprises disposing over said surface a liquid and a plurality of colored particles having particle sizes at least some of which are greater than the cracks to be detected, allowing the liquid to at least partially drain through said surface and observing any accumulation of said colored particles on said surface after drainage of liquid therefrom to determine the presence of cracks in said surface.

9. The method of detecting cracks in porous surfaces, which comprises flooding the surface with a suspension of a plurality of pigment particles of varying colors and particle sizes dispersed in a liquid medium, at least some of said pigment particles having particle sizes greater than the cracks to be detected, whereby different sized cracks may be detected visually.

TABER DE FOREST.
HENRY N. STAATS.

REFERENCES CITED

The following references are of record in the file of this patent:

UNITED STATES PATENTS

| Number | Name | Date |
| --- | --- | --- |
| 2,259,400 | Switzer | Oct. 14, 1941 |
| 2,340,940 | De Forest | Feb. 8, 1941 |
| 2,393,996 | Layton | Feb. 5, 1946 |
| 2,420,646 | Bloom, Jr., et al. | May 20, 1947 |